3,583,873
STABILIZATION OF THE NATURAL GREEN
COLOR OF PIGEON PEAS
James W. Barlow, Montreal, Quebec, Canada, assignor to Catelli Food Products Ltd., Montreal, Quebec, Canada
No Drawing. Filed June 14, 1967, Ser. No. 645,891
Claims priority, application Canada, June 15, 1966, 963,063
Int. Cl. A23l 1/20
U.S. Cl. 99—98          11 Claims

ABSTRACT OF THE DISCLOSURE

The natural green colour of pigeon peas is stabilized by treating pigeon peas, after being made ready for canning, in the presence of water with a compound capable of yielding sulphur dioxide at a pH of 6 or less. Edible organic acids may also be added. The products of the invention obtained after processing contain a residual amount of sulphur dioxide of 100 p.p.m. to 1000 p.p.m.

---

This invention relates to the stabilization of colour of green peas. More particularly, this invention relates to the stabilization of the natural green colour of pigeon peas.

BACKGROUND OF THE INVENTION

Pigeon peas (*Cajanus indicus*) are also known as Congo peas or green gandures. This vegetable is well known in India, Hawaii, Puerto Rico and the British West Indies. It has long been used in these areas as a foodstuff by the population. A general characteristic of this type of pea that has prevented its general acceptability is that this product discolours on canning from its natural green colour to a greyish brown.

The use of sulphur dioxide has long been established as a means of preventing, retarding, or even reversing the browning reaction of fruit and fruit products. It has, however, been confined mainly to dehydrated vegetables or fruits, to fruit juices, concentrates and the like, and to bleaching or preserving onions, cherries and the like.

For green vegetables, and for ordinary green peas (*Pisum sativum*) in particular, it has long been known that the chemical changes which result in the destruction of the chlorophyll are accompanied by a notable increase in the acidity of the product. A solution to the colour change was therefore found in controlling the pH of the product by addition, for example, of suitable alkaline reagents. Canadian Pat. 395,432 to J. S. Blair describes such an alkalizing process.

SUMMARY OF THE INVENTION

It has now been found that the natural green colour of pigeon peas can be stabilized by using sulphur dioxide or reagents giving off sulphur dioxide. If desired, other suitable acid reagents can also be added, as will be described more fully hereinafter.

It is accordingly an object of the present invention to provide a method for processing pigeon peas that results in the retention of the green colour of these peas and in a reduction in the bitter flavour associated with the present methods of processing the same.

In accordance with the present invention, there is provided a method of stabilizing the natural green colour of pigeon peas which comprises subjecting said peas to the action of a compound capable of liberating sulphur dioxide at a pH of 6 or less, and the peas are treated with an aqueous solution having a pH of 6 or less.

A convenient source of sulphur dioxide is a suitable salt of sulphurous acid. Preferred is sodium metabisulphite. Potassium metabisulphite may also be used.

Although the present invention is not restricted by any theory, it is believed that, while prior art processes for stabilizing the green colour of garden peas were based on the retention of the chlorophyll colour during processing, the browning reaction in pigeon peas is probably a non-enzymatic browning reaction (Maillard reaction) wherein the formation of dark pigments resulting from this reaction apparently masks the green colour of the chlorophyll.

To be effective, the reagent employed to give off $SO_2$ must be used in an amount sufficient to obtain at least 100 parts per million of $SO_2$ in the finished product. Little advantage is obtained by using more than 1000 p.p.m. A preferred range is one that results in the peas, after processing, containing 500–700 p.p.m.

In a preferred embodiment of the invention, it has been found that the effect of sulphur dioxide is remarkably enhanced by adding an edible organic acid to lower and control the pH. Suitable organic acids include citric acid, malic acid, tartaric acid, fumaric acid and adipic acid.

Accordingly, although a compound capable of yielding sulphur dioxide can be used alone in treating pigeon peas in accordance with the invention, in practice, it is preferred to take advantage of the combined effect referred to above by using both reagents. A most preferred combination is sodium metabisulphite and citric acid.

Ascorbic acid is widely employed in the food processing industry as an additive. It can be used, as will be apparent to persons skilled in the art, in addition to other edible organic acids and sulphur dioxide, to effect additional flavour improvement.

In accordance with one embodiment of the present invention, the peas, after being made ready for canning, i.e. vined, cleaned and washed in accordance with standard procedure, are blanched in an aqueous medium containing the aforesaid acid reagent or reagents at the usual boiling or near boiling temperature for a suitable length of time, usually a few minutes. The blanched peas may then be cooled if desired. The peas are then canned in brine. Sugar may be added to the brine for flavour as desired.

In accordance with another embodiment of the present invention, the peas, after being made ready for canning as mentioned hereinbefore, are subjected to soaking in an aqueous medium containing the aforesaid acid reagent or reagents at room temperature or at a temperature slightly above e.g. 70° F. for an hour or more. Following this soaking step, the peas are drained and canned in brine which may contain sugar as desired, as will be apparent to those skilled in the art.

In accordance with a still further embodiment of the invention, the peas, processed in the usual manner and ready for canning, i.e. vined, cleaned and washed, are placed directly in cans and covered with the usual brine solution containing the aforementioned sulphur dioxide and acid reagent, optionally containing also sugar.

Following canning, in accordance with usual practice, the peas are sterilized and rapidly cooled prior to storage.

In the above embodiments, whenever applicable, it will be understood that, in accordance with standard practice, brine is usually added hot e.g. at a temperature of about 190° F. to shorten the period of sterilizing that follows canning. Also in accordance with standard practice, in the pea industry, the normal constituent of brine is sodium chloride.

DESCRIPTION OF PREFERRED EMBODIMENTS

The invention will now be described in further detail with reference to the following non-limiting examples.

Example 1

One thousand (1000) grams of frozen pigeon peas were blanched for five minutes at boiling temperature in 800 grams of a solution of the following composition:

| | Grams |
|---|---|
| Sodium metabisulphite ($Na_2S_2O_5$) | 2.4 |
| Citric acid ($C_6H_8O_7 \cdot H_2O$) | 2.4 |
| Water | 795.2 |
| Total | 800.0 |

At the completion of the blanching period, the peas were drained, cooled and canned in a solution of the following composition:

| | Grams |
|---|---|
| Water | 1000 |
| Salt (NaCl) | 20 |
| Sugar (sucrose) | 40 |

The cans were placed in a static retort at 240° F. for 35 minutes for sterilization. On completion of the sterilization cycle, they were rapidly cooled.

Example 2

One thousand (1000) grams of frozen pigeon peas were soaked for two (2) hours at 70° F. in 800 grams of a solution of the following composition:

| | Grams |
|---|---|
| Water | 792 |
| Sodium metabisulphite | 4 |
| Citric acid | 4 |

At the completion of the soaking period, the peas were drained and canned in a solution of the following composition:

| | Grams |
|---|---|
| Water | 1000 |
| Sugar (sucrose) | 40 |
| Salt (NaCl) | 20 |

The above solution was at a suitable temperature in accordance with usual canning manufacturing practice.

The cans were placed in a static retort and sterilized at 240° F. for 35 minutes. On completion of the sterilization cycle, they were rapidly cooled.

Example 3

Frozen pigeon peas were washed and placed directly in cans to ½ inch from the top of the can. The peas were then covered with a solution of the following composition:

| | Percent |
|---|---|
| Water | 93.90 |
| Sugar | 3.76 |
| Salt | 1.88 |
| Sodium metabisulphite | 0.33 |
| Citric acid | 0.13 |
| | 100.00 |

The cans were sealed, placed in a static retort and sterilized for 35 minutes at 240° F. At the end of the sterilization period, they were rapidly cooled.

In the above embodiment, the addition of the metabisulphite, citric acid, sugar and salt may be made in tablet form, prior to sealing. As will be apparent, the addition of one or several tablets in the above manner greatly facilitates continuous operation and is within the scope of the present invention.

As will be equally apparent, several combinations of the process of the present invention are possible without departing from the scope thereof, the only essential aspect being the treatment of the peas as defined in the appended claims.

Further to stabilizing the colour of the pigeon peas, the process of the invention also results in reducing the bitter flavour normally associated with this variety of peas.

I claim:

1. A method of stabilizing the natural green colour of pigeon peas which comprises treating pigeon peas after being made ready for canning in an aqueous solution having a pH of 6 or less with a compound capable of yielding sulphur dioxide at a pH of 6 or less, said compound being employed in an amount and for a period of time such that after the treatment the pigeon peas contain at least 100 parts per million of $SO_2$.

2. A method as claimed in claim 1 wherein said compound is an alkali metal metabisulphite.

3. A method as claimed in claim 1 wherein said compound is sodium metabisulphite.

4. A method as claimed in claim 1 wherein the pH of the aqueous solution is maintained at 6 or less by said compound.

5. A method according to claim 1 wherein the peas are soaked in an aqueous solution having a pH of 6 or less, with a compound capable of yielding sulphur dioxide at a pH of 6 or less, the peas are drained and then mixed with a brine solution and the resulting mixture is hermetically sealed in cans and sterilized.

6. A method according to claim 1 in which the peas are treated with said compound by soaking therewith at the boiling temperature.

7. A method according to claim 1 in which the peas are placed in cans and covered with an aqueous solution having a pH of 6 or less containing the compound capable of yielding $SO_2$ and the cans are hermetically sealed and sterilized.

8. A method as claimed in claim 1 wherein the pH of the aqueous solution is maintained at 6 or less by the addition of an edible organic acid.

9. A method as claimed in claim 8 wherein said edible organic acid is selected from the group consisting of citric acid, malic acid, tartaric acid, ascorbic acid, fumaric acid and adipic acid.

10. A method as claimed in claim 1 wherein said compound is used in an amount up to 1000 parts per million.

11. A method as claimed in claim 10 wherein said compound is used in an amount such that the pigeon peas contain 500 to 700 parts per million of $SO_2$ after said treatment.

References Cited

UNITED STATES PATENTS

| 2,011,465 | 8/1935 | Balls et al. | 99—1 |
|---|---|---|---|
| 2,178,675 | 11/1939 | Thomas | 99—193 |
| 2,821,482 | 1/1958 | Nieva | 99—186 |
| 3,454,404 | 7/1969 | Watanabe | 99—98 |

RAYMOND N. JONES, Primary Examiner

W. A. SIMONS, Assistant Examiner